United States Patent [19]
Bartz

[11] Patent Number: 4,961,481
[45] Date of Patent: Oct. 9, 1990

[54] HYDRAULIC ACTUATION SYSTEM

[76] Inventor: Herbert J. Bartz, 2589 Puesta del Sol, Santa Barbara, Calif. 93105

[21] Appl. No.: 293,004

[22] Filed: Jan. 3, 1989

[51] Int. Cl.⁵ .............................................. F16F 9/46
[52] U.S. Cl. .................... 188/130; 280/705; 188/299
[58] Field of Search ................ 188/130, 299, 106 R; 280/705, 714; 417/501

[56] References Cited

U.S. PATENT DOCUMENTS

| | | | |
|---|---|---|---|
| 1,724,423 | 8/1929 | Saives | 188/130 |
| 1,819,855 | 8/1931 | Wilson | 188/130 |
| 1,921,025 | 8/1933 | Fox | 188/299 |
| 2,047,414 | 7/1936 | Henry et al. | 417/501 |

FOREIGN PATENT DOCUMENTS

| | | | |
|---|---|---|---|
| 502500 | 7/1930 | Fed. Rep. of Germany | 188/130 |
| 546392 | 3/1932 | Fed. Rep. of Germany | 188/130 |
| 596425 | 5/1934 | Fed. Rep. of Germany | 188/130 |

Primary Examiner—Charles A. Marmor
Assistant Examiner—Karin Tyson
Attorney, Agent, or Firm—William W. Haefliger

[57] ABSTRACT

A control system for a vehicle axle-to-wheel shock absorber includes a fluid pressure responsive actuator to variably compress friction elements; and a fluid pressure control unit having a body and plunger, and a rotary manual control, the plunger having a stem with threaded connection to the unit body to advance and retract the plunger as the manual control is rotated forwardly and reversely.

6 Claims, 5 Drawing Sheets

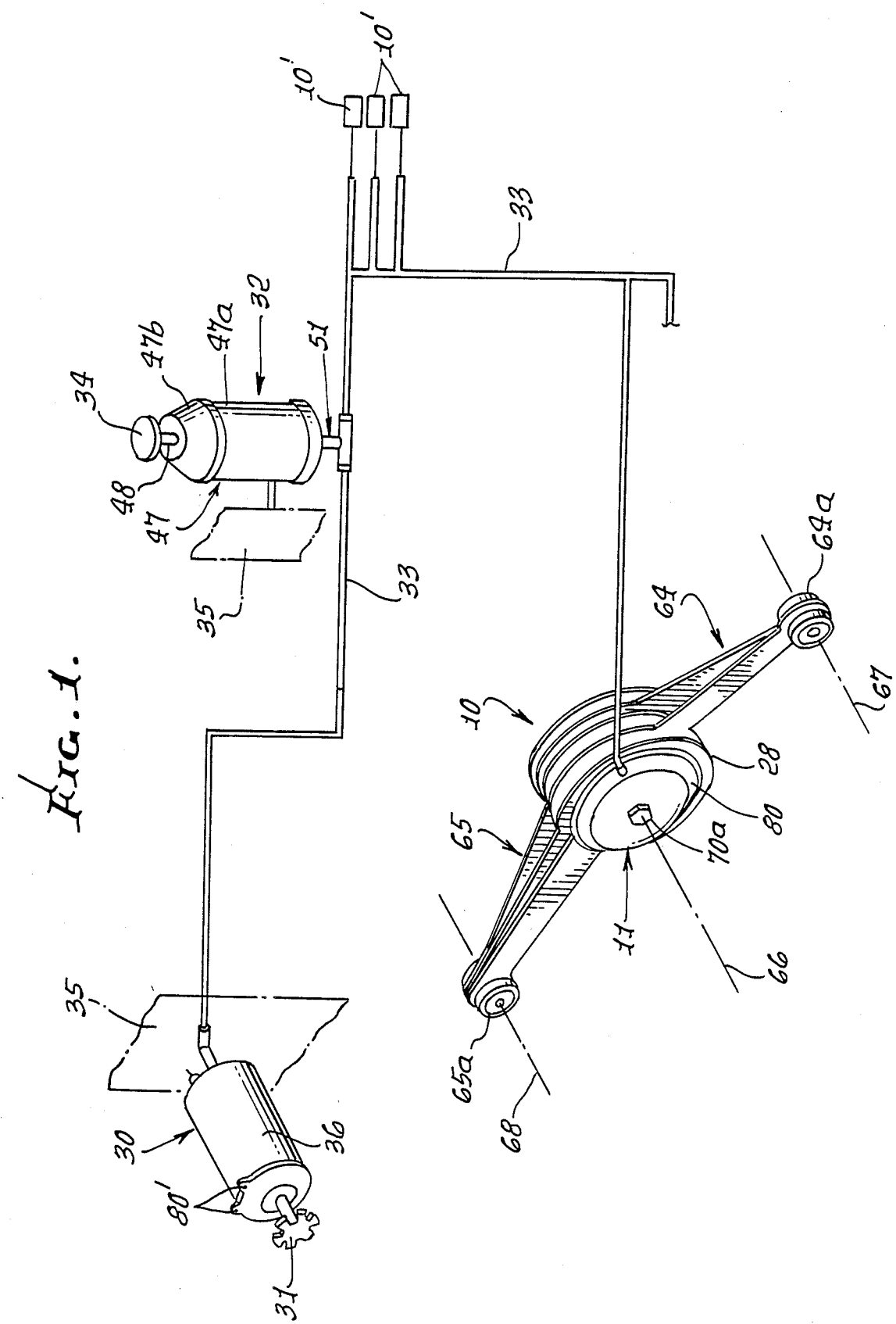

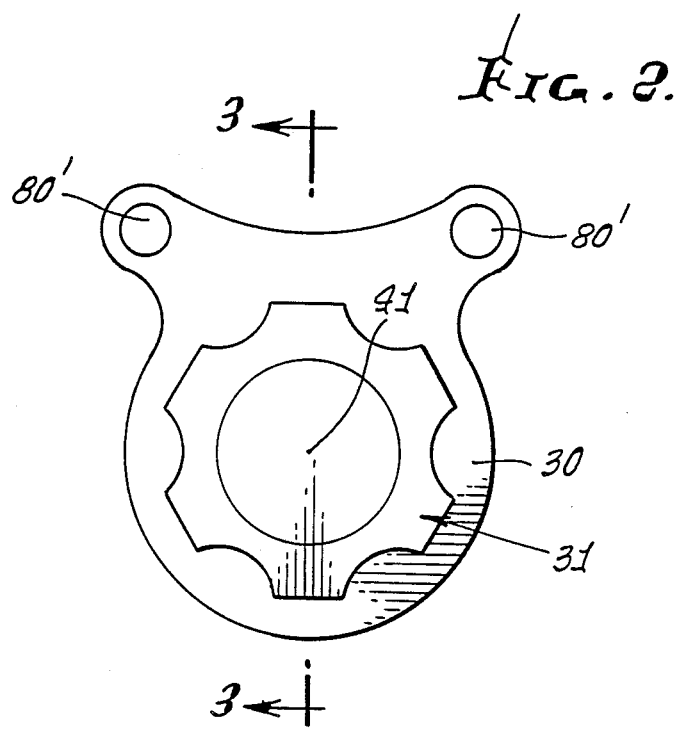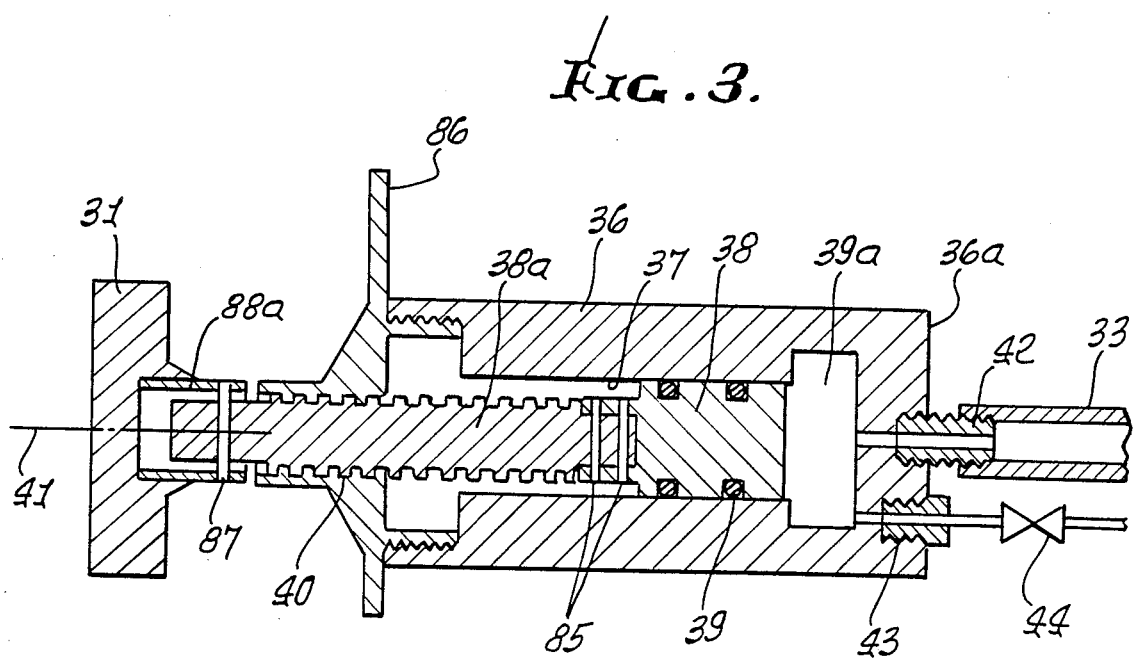

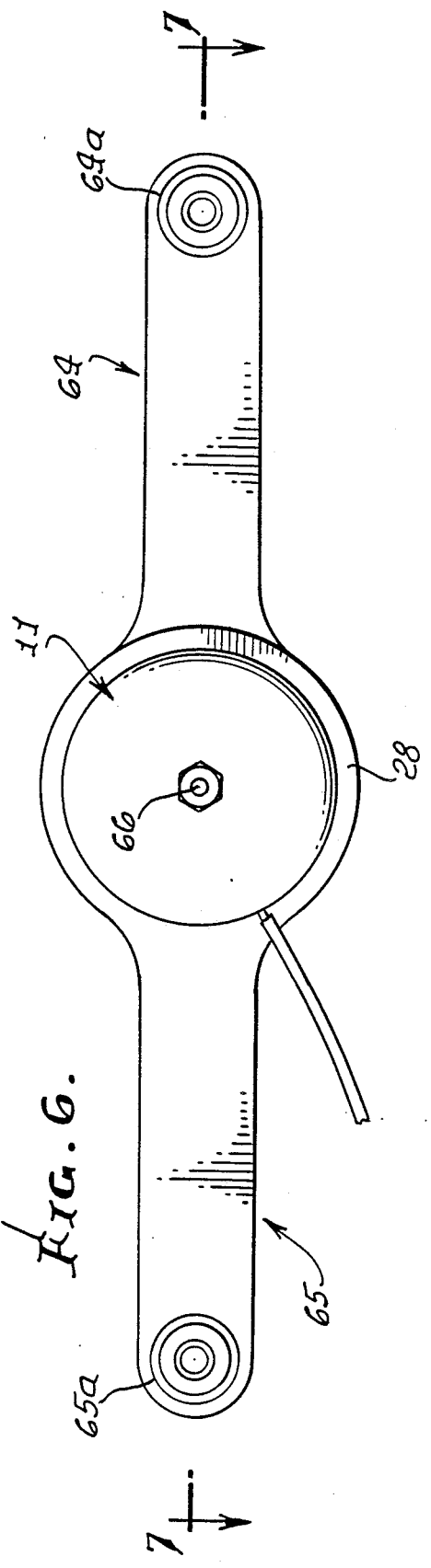
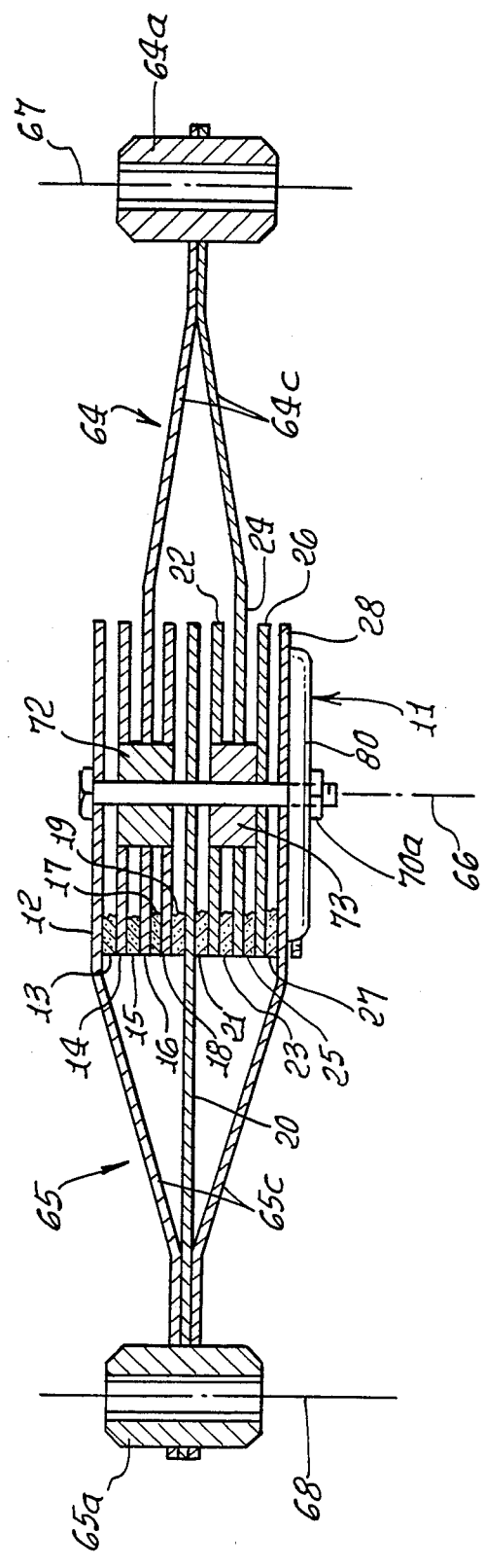

HYDRAULIC ACTUATION SYSTEM

BACKGROUND OF THE INVENTION

This invention relates generally to controllable shock absorbers for vehicles, and more particularly to a system whereby a vehicle-occupant or user can easily and quickly manually control or "set" the stiffness of vehicle shock absorbers.

Vehicle users commonly sense shock loading of a vehicle and its "bounce" on road surfaces differently, so that what is acceptable to one user is unacceptable to another There is need for an easily usable, reliable, simple system whereby a user can set the stiffness or "give" of a shock absorber, or absorbers, to suit his preferences. This becomes critical when the user has back injury or pain that must be accommodated to vehicle roughness or bounce as much as possible.

SUMMARY OF THE INVENTION

It is a major object of the invention to provide reliable system and apparatus enabling accomplishment of the above goal, i.e. to meet the need for simple, reliable means for adjusting shock absorber stiffness, as by merely operating a control in the passenger compartment. It is a further object to provide highly accurate variable control of shock absorber "stiffness" or "give".

Basically, the invention is embodied in a control system for a vehicle axle-to-frame shock absorber having friction elements that resist relative movement during shock absorption. The system comprises:

(a) a fluid pressure responsive actuator operatively connected to the shock absorber to convert variations in fluid pressure to variations in mechanical loading acting to variably compress together the friction elements, (b) and a fluid pressure control unit having (i) a body defining a bore and a plunger movable in the bore, the body and plunger also defining a fluid pressure chamber communicating with the actuator to supply fluid pressure variations thereto, (ii) a rotary manual control, and (iii) the plunger including a stem connected with the manual control, the stem having threaded connection with the body to advance and retract the plunger as the manual control is rotated forwardly and rearwardly.

Typically, and as will be seen, the fluid is hydraulic fluid, and a make-up fluid supply means is provided to include a fluid reservoir, a check valve connected between the reservoir and a hydraulic line that communicates between the chamber and the actuator, and a manually operable pump associated with the reservoir to displace fluid from the reservoir past the check valve and to the hydraulic line in response to operation of the pump. Also, a fluid pressure bleed means is operatively associated with the chamber, to bleed hydraulic fluid when the pump is operated to fill make-up fluid into the system.

Also, the pump advantageously includes a tube in the reservoir and having a side outlet to communicate fluid between the reservoir and the tube interior, and a pump plunger is reciprocable in the tube to draw fluid into the interior, as the plunger is retracted, and to displace fluid from the tube interior past the check valve and into the hydraulic line, as the plunger is advanced.

In this way, the operator can easily supply makeup hydraulic fluid into the system, after slow leakage past seals, to enable "vernier" control of shock absorber stiffness, all from the comfort of the passenger compartment.

The shock absorber itself typically has a first arm connected to certain of the friction elements, and a second arm connected to other of the friction elements, the shock absorber defining a joint having an axis about which the arms are relatively rotatable. One arm is connectible with a vehicle axle, and the other arm connectible with a vehicle chassis, with the actuator located at the joint, to provide a reliable, compact, free floating absorber and actuator combination. A connector may axially attach the actuator to the joint so that the actuator axially and variably compresses the friction elements in response to operation of the control unit.

These and other objects and advantages of the invention, as well as the details of an illustrative embodiment, will be more fully understood from the following specification and drawings, in which:

DRAWING DESCRIPTION

FIG. 1 is a perspective view of the system of the invention;

FIG. 2 is an end view of the control cylinder seen in FIG. 3;

FIG. 3 is a section taken on lines 3—3 of FIG. 2;

FIG. 6 is a top plan view of the shock absorber unit of FIG. 7; and

FIG. 7 is a section taken on lines 7—7 of FIG. 6.

DETAILED DESCRIPTION

Figure 4:
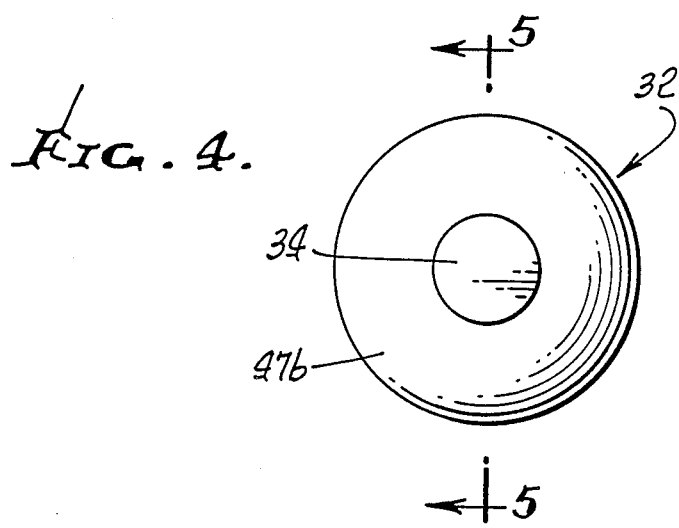
FIG. 4 is top plan view of the reservoir seen in FIG. 5.

In FIG. 1 the system shown includes a shock absorber unit 10, and a fluid pressure responsive actuator 11 operatively connected to the shock absorber to convert variations in fluid pressure to variations in mechanical loading acting to variably compress together friction elements 12–28 of the absorber unit 10 (see FIG. 7). Also FIG. 1 illustrates a fluid pressure control unit or cylinder 30, manually controllable at 31 to control fluid pressure applicable to actuator 11; and a fluid pressure supply means 32 to supply make-up hydraulic fluid (i.e. liquid) to the system ducting 33 that interconnects 30 and 11. Note manual control 34 associated with 32 to operate same, as required. Unit 30 is normally attached to a vehicle panel 35 as via connections at 80' to be accessible to the driver sitting in the passenger compartment; and reservoir or supply means 32 is attached to panel 35, or other panel, to be accessible when the vehicle engine hood is lifted. Thus, reservoir 32 is typically mounted in the engine compartment.

Turning to FIG. 3, the control unit 30 typically inclues (i) a body 36 defining a bore 37 and a plunger 38 movable in that bore, the body and plunger defining a fluid pressure chamber 39a communicating with the actuator 11 to supply fluid pressure variations thereto;

(ii) a rotary manual control 31 (as referred to above); and (iii) the plunger including a stem 38a connected with the manual control, the stem having threaded connection at 40 with the body 36 to advance and retract the plunger as the control 31 is rotated forwardly and rearwardly about axis 41.

Note also O-ring seals 39 between the plunger and bore 37; tubular fitting 42 in end wall 36a of the body to connect chamber 39a to line 33; and bleed fitting 43 in end wall 36a to discharge gas bubbles in the hydraulic system when liquid is filled into line 33. A bleed valve 44 connects with fitting 43. See also seals 87 and 88a.

Figure 5:
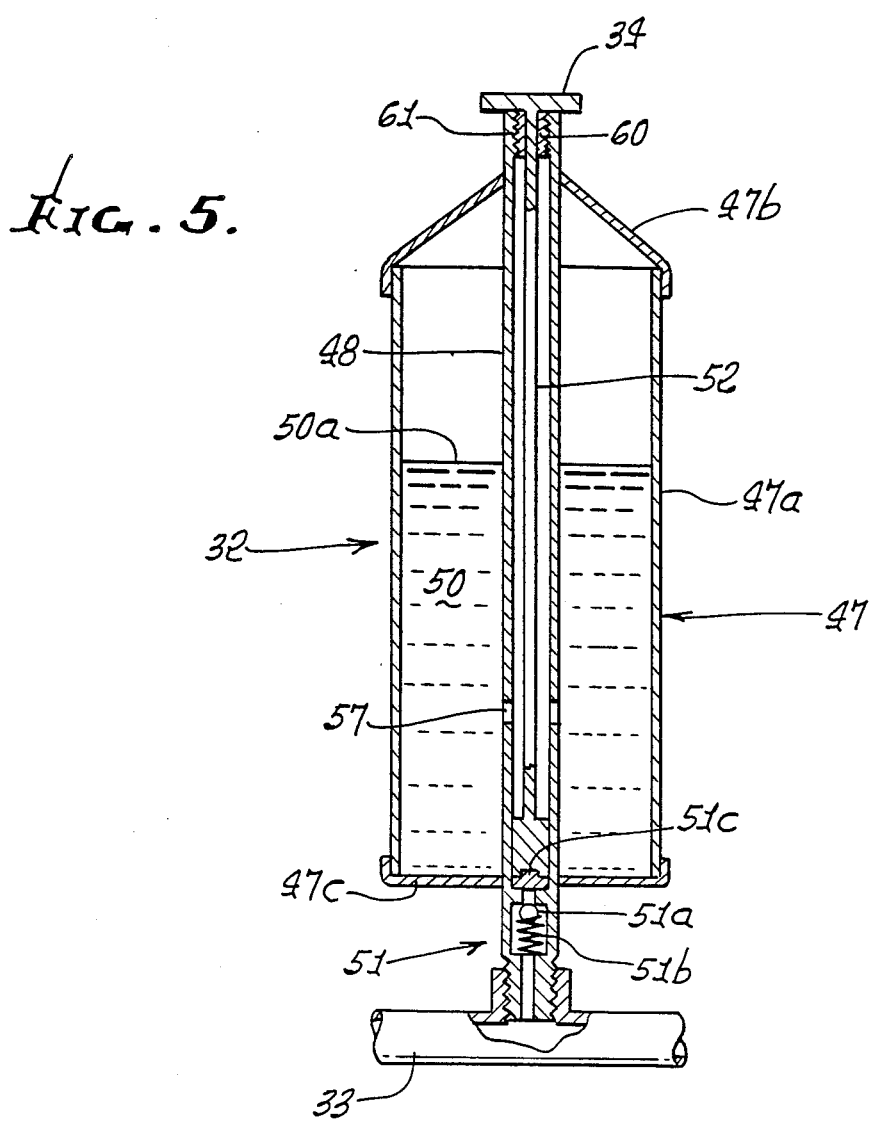
FIG. 5 is a section taken on lines 5—5 of FIG. 4.
Figure 8:
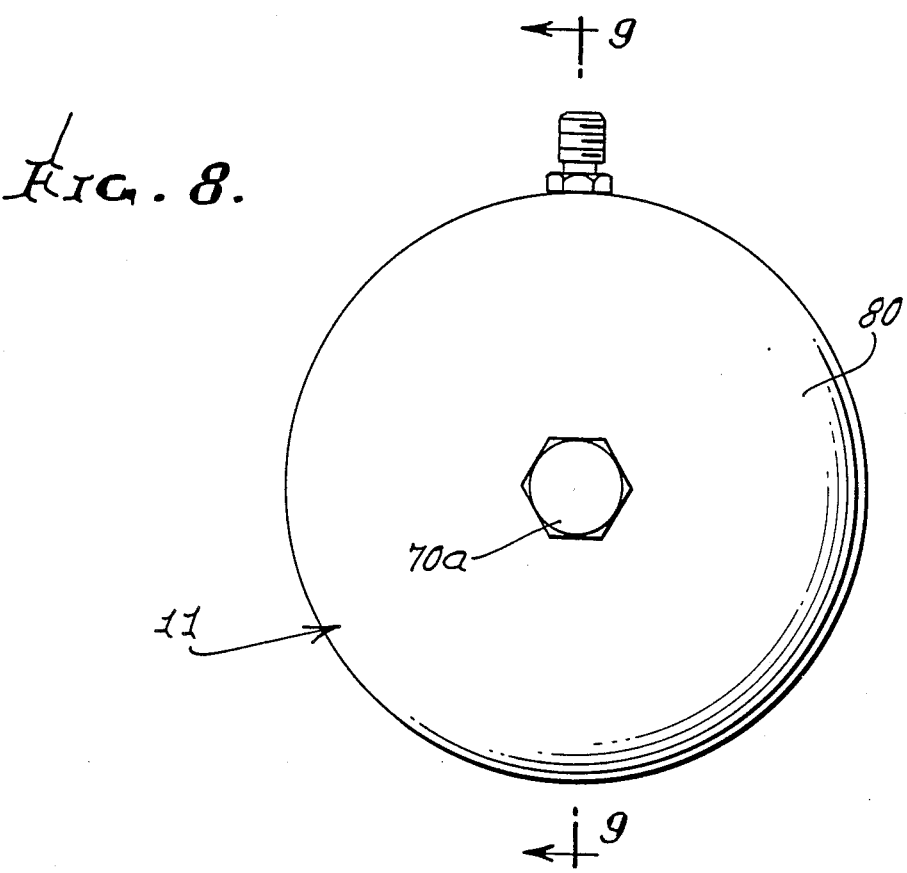

Referring to FIG. 5, the reservoir 32 includes a reservoir body or shell 47 having side, top and bottom walls 47a and 47b and 47c; a vertical tube 48 extending axially through the shell; and a manually operable pump in the tube 48 to displace make-up hydraulic fluid from the reservoir interior 50 past a check valve 51 and to line 33 when the pump is vertically reciprocated. The pump includes a vertical rod 52 to which control handle 34 is connected, and a plunger 54 connected to the rod 52 to draw liquid from the reservoir 50 into the tube below the plunger via side port or outlet 57 in the tube as the plunger is elevated or retracted, and to displace fluid from the tube interior past the check valve and to line 33 as the plunger is advanced downwardly. Hydraulic fluid may be poured into tube 48 to fill the reservoir (as to level 50a), after upward removal of a tubular fitting 60 and the plunger and stem 52. Fitting 60 has thread fit at 61 with tube 48.

The shock absorber 10 has a first arm 64 connected to certain of the friction elements, and a second arm 65 connected to other of the friction elements, the shock absorber defining a joint having an axis 66 about which the arms are relatively rotatable. One arm 64 has an end fitting 64a connectible with a vehicle axle having an axis 67, and the other arm 65 has its end 65a connectible with a vehicle chassis at a joint having an axis 68. Arm end 65a is normally located generally above arm end 64a. The actuator 11 is located at the intermediate joint between the arms that defines axis 66. Steel discs 12 and 28 are connected to arm 65; and steel discs 16 and 24 are integral with arm 64, as shown. Friction pads 13, 15, 17, 19, 21, 23, 25 and 27 are located between metal discs 12, 14, 16, 18, 20, 22, 24, 26 and 28, as shown. A central bolt 70 passes through elements 12–28 and holds them in coaxial relation, while being capable of relative axial movement to apply variable compressive force to the friction pads, which then variably resist relative rotation of the arms 64 and 65 about joint axis 66. The friction pads may consist of vulcanized phenolic impregnated paper. Note also centering parts 72 and 73.

Figure 9:
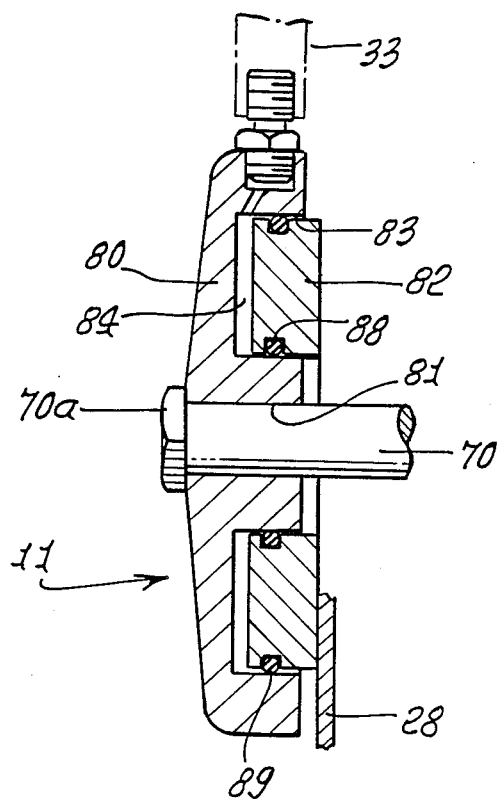

As shown in FIG. 9, the actuator 11 includes an annular body 80 retained to the side of disc 28 by the bolt 70 that passes through the body bore 81. An annular plunger 82 fits within annular bore 83 in the actuator and presses against the disc 28 in response to hydraulic pressure application to the chamber in 84 the actuator, as fed from line 33. This causes the body 80 to move relatively away from disc 28 carrying the nut 70a of the bolt with it, thereby effecting compression of the metal discs against the friction pads, as referred to above. Note annular seals 88 and 89.

Accordingly, a simple, reliable, highly effective system is provided to enable the vehicle driver to control and vary the shock dampening effect provided by the shock absorber or absorbers. Four such absorbers are normally employed, one near each wheel, and FIG. 1 shows same, at 10'.

Check valve 51 includes a ball 51a, spring 51b, and ball seat 51c, seen in FIG. 5.

FIG. 3 shows pins 85 connecting stem 38a to plunger 38; flange 86; and pin 87 connecting 38a to sleeve 88 of handle 31.

FIG. 7 shows tapered arm members 64c and 65c.

Additional shock absorbers, like absorber 10, are seen at 10' in FIG. 1, and are connected to line 33.

I claim:

1. In a control system for a vehicle axle-to-frame shock absorber having friction elements that resist relative movement during shock absorption, the combination comprising:
   (a) a fluid pressure responsive actuator operatively connected to the shock absorber to convert variations in fluid pressure to variations in mechanical loading acting to variably compress together the friction elements,
   (b) a fluid pressure control unit having
      (i) a body defining a bore and a plunger movable in the bore, the body and plunger defining a fluid pressure chamber communicating with said actuator to supply said fluid pressure variations thereto, said body being provided with a fluid pressure bleed means operatively connected with said chamber,
      (ii) a rotary manual control, and
      (iii) a stem connected with the manual control and the plunger the stem having threaded connection with the body to advance and retract the plunger as the manual control is rotated forwardly and rearwardly,
   (c) a hydraulic line fluidly connecting said pressure control unit with said actuator,
   (d) fluid supply means operatively connected with said chamber, said fluid supply means including a fluid reservoir, and
   (e) a manually operable pump located in said reservoir to displace fluid from the reservoir through the pump to said hydraulic line in response to operation of the pump,
   the pump including a tube in the reservoir and having a side opening to communicate fluid between the reservoir and the tube interior, a second opening having a check valve operative therein, and a pump plunger reciprocable in the tube to draw fluid into the interior, as the plunger is retracted, and to displace fluid from the tube interior past the check valve and into the line, as the plunger is advanced.

2. The combination of claim 1 including said shock absorber having a first arm connected to certain of the friction elements, and a second arm connected to other of the friction elements, the shock absorber defining a joint having an axis about which said arms are relatively rotatable, one arm connectible with a vehicle axle, and the other arm connectible with a vehicle chassis, said actuator located at said joint.

3. The combination of claim 2 including a connector means axially attaching the actuator to the joint so that the actuator axially and variably compresses the friction elements in response to operation of said control unit.

4. The combination of claim 1 including the vehicle having a passenger compartment, the control unit being at said compartment.

5. The combination of claim 2 wherein the vehicle has a passenger compartment, and wherein both said control unit and said reservoir, with said pump, are at said compartment.

6. The combination of claim 1 including additional shock absorber or absorbers operatively connected with said actuator and said fluid supply means.

* * * * *